United States Patent [19]

Shimamura et al.

[11] Patent Number: 4,750,130
[45] Date of Patent: Jun. 7, 1988

[54] FUEL DELIVERY DISPLAY AND CONTROL SYSTEM

[75] Inventors: Norio Shimamura; Kazuhiro Ishibashi; Masaru Takabatashi; Hiroyuki Okaniwa, all of Tokyo, Japan

[73] Assignee: Tokyo Tatsuno Co., Ltd., Tokyo, Japan

[21] Appl. No.: 837,453

[22] Filed: Mar. 7, 1986

[30] Foreign Application Priority Data

Mar. 20, 1985 [JP] Japan .................. 60-56634
Mar. 20, 1985 [JP] Japan .................. 60-56636

[51] Int. Cl.⁴ .............. G06F 15/22; G09G 3/36; B67D 5/24
[52] U.S. Cl. .................. 364/465; 340/792; 364/406
[58] Field of Search .............. 364/405, 406, 465; 340/792

[56] References Cited

U.S. PATENT DOCUMENTS

| | | | |
|---|---|---|---|
| 4,205,312 | 5/1980 | Nelson | 340/792 |
| 4,212,068 | 7/1980 | Hoyt | 364/465 |
| 4,216,529 | 8/1980 | Krystek et al. | 364/465 |
| 4,247,899 | 1/1981 | Schiller et al. | 364/465 |
| 4,410,949 | 10/1983 | Huellinghorst et al. | 364/465 |
| 4,518,959 | 5/1985 | Ueda et al. | 340/792 |
| 4,589,069 | 5/1986 | Endo et al. | 364/405 |
| 4,607,334 | 8/1986 | Shino et al. | 364/405 |
| 4,647,927 | 3/1987 | Ichikawa et al. | 340/792 |

*Primary Examiner*—Felix D. Gruber
*Attorney, Agent, or Firm*—Jordan and Hamburg

[57] ABSTRACT

Fuel delivery display and control system having a dot-matrix panel on which normally a first message is indicated but when a nozzle is taken up for fuel delivery, the first message is replaced with a second message with scrolling for confirmation of no faults in the display elements whereupon the panel displays delivery information consisting of a unit volume price, a delivered fuel volume and a total price to be paid. If necessary, in advance of taking up the nozzle, a switch can be manually actuated so that the delivered fuel volume only is indicated on the panel.

10 Claims, 5 Drawing Sheets

FUEL DELIVERY DISPLAY AND CONTROL SYSTEM

FIELD OF THE INVENTION AND RELATED ART

This invention relates to a fuel delivery display and control system, and more particularly to such system having a dot-matrix display on which fuel delivery information and messages are selectively indicated.

On a conventional display panel of the seven-segments type for a fuel dispenser, generally the volume of the delivered fuel only has been indicated. Recently, however, it is desired to indicate the unit volume price and the total price to be paid by the customer, in addition thereto.

When using the so-called dot-matrix display panel having many small display units such as light bulbs, ligh emission diodes, liquid crystal segments and the like arranged for instance in 8×40 to be energized in reply to information stored in memory means, it is possible to indicate not only numerical figures for the fuel delivery information but also letters for advertisements or slogans e.g. "Special Sale Of Tires" different from the seven segments display usual in the gasoline station.

SUMMARY OF THE INVENTION

An object of the invention is to provide a fuel delivery display and control system whereby it is made possible to normally indicate a first message on a dot-matrix display panel in a scrolling mode and automatically change such indication by taking up the hose nozzle from a hook therefor to display all fuel information, namely the unit volume price, the volume of the delivered fuel and the total price to be paid by the customer, which may be changed to a display of only the volume of the delivered fuel by manual actuation made in advance.

Another object of the invention is to provide the system as referred to above, whereby it is made possible to confirm if there is no trouble in the display system by indicating a second message in a scrolling mode before said change of indication on the display panel.

Said objects can be attained according to the invention, by providing a fuel delivery display and control system which comprises a dot-matrix display panel having many elements so arranged that the energized elements may represent not only numerical figures but also letters, means for energizing said elements in accordance with supplied signals, memory means for storing a desired message, memory means for storing a unit volume price, means for generating a pulse signal representing fuel volume, means for totalling the delivered fuel volume according to the supplied pulse signal and storing said total volume, means for calculating the total price of the fuel from said unit volume price and said delivered fuel volume and storing said total price, and switching means arranged between said memory means and said energizing means so as to switch over from the normally supplied message signal to fuel information in reply to a signal of commencing fuel delivery. Preferably said desired message storing means consists of memory means for storing the first message and memory means for storing the second message both to be indicated on said display panel in a scrolling mode and preferably further comprises a switch adapted to be normally in an "OFF" position but changed to be in an "ON" position when a nozzle is taken up for commencing fuel delivery so as to erase stored information on the delivered fuel volume and the total price of the last fuel delivery, and actuate said switching means to switch over from the normally supplied first message to said second message and then to fuel information after termination of the second message display.

DESCRIPTION OF THE PREFERRED EMBODIMENTS

Figure 1:
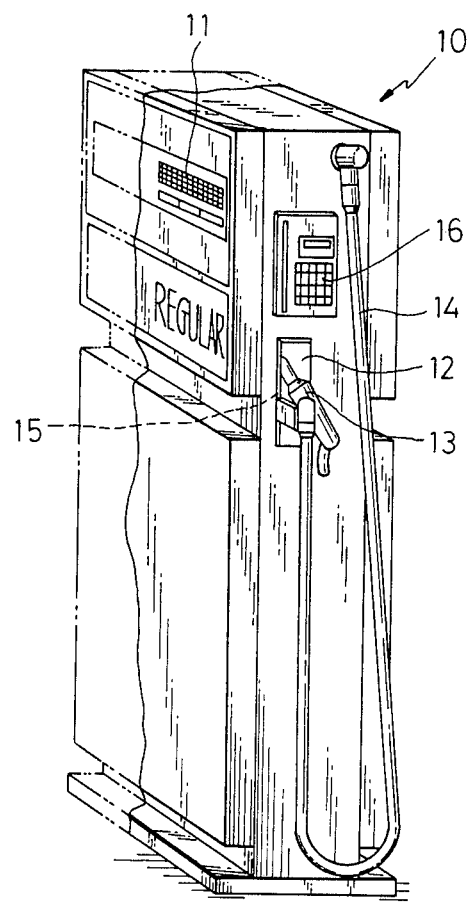
FIG. 1 is a perspective view of a fuel dispenser incorporating the fuel delivery display and control system according to the invention.

In FIG. 1, the fuel dispenser represented generally by 10 comprises display panel 11 of the dot-matrix type, which may selectively indicate fuel delivery information and a desired message, mounted on the front wall of the upper casing. There is a designation such as "REGULAR" under said display panel. The left half shown by phantom lines may be a dispenser for another fuel, e.g. for diesel fuel.

On the side wall, there is provided a receptacle 12 in which a nozzle 13 mounted at the free end of a flexible hose 14 may be hung so that a nozzle switch 15 arranged in said receptacle is normally in an "OFF" position. When said nozzle 13 is taken up from said receptacle 12, said switch 15 is automatically actuated to be in an "ON" position. According to a conventional dispenser, however, a motor is directly energized thereby to drive a pump for fuel delivery so that when actuating a trigger the fuel is discharged through said nozzle and the last fuel information is reset to "zero" thereby. In the system of the invention, the first message normally appears in a scrolling mode on the display panel, that is, the message moves or rolls across the display panel 11. The first message may be, for example, "Special Sale Of Tires" and is subsequently changed to the second message e.g. "Welcome" appearing in a scrolling mode. An arrangement is utilized for confirming if all dots such as small light tubes, light emission diodes and liquid crystal segments are active to indicate correct delivery information as explained later in more detail.

On said side wall there is arranged further a key and switch board 16 for inputting numerical figures representing the unit volume price, e.g.¥173 per liter set for the day and letters of the desired messages to be stored in memories, which may be confirmed by a small display panel illustrated above said board 16.

In the casing there are installed a fuel flow meter, a flow pulse generator, memory means, control means and the like in addition to the motor and the pump.

Figure 2:
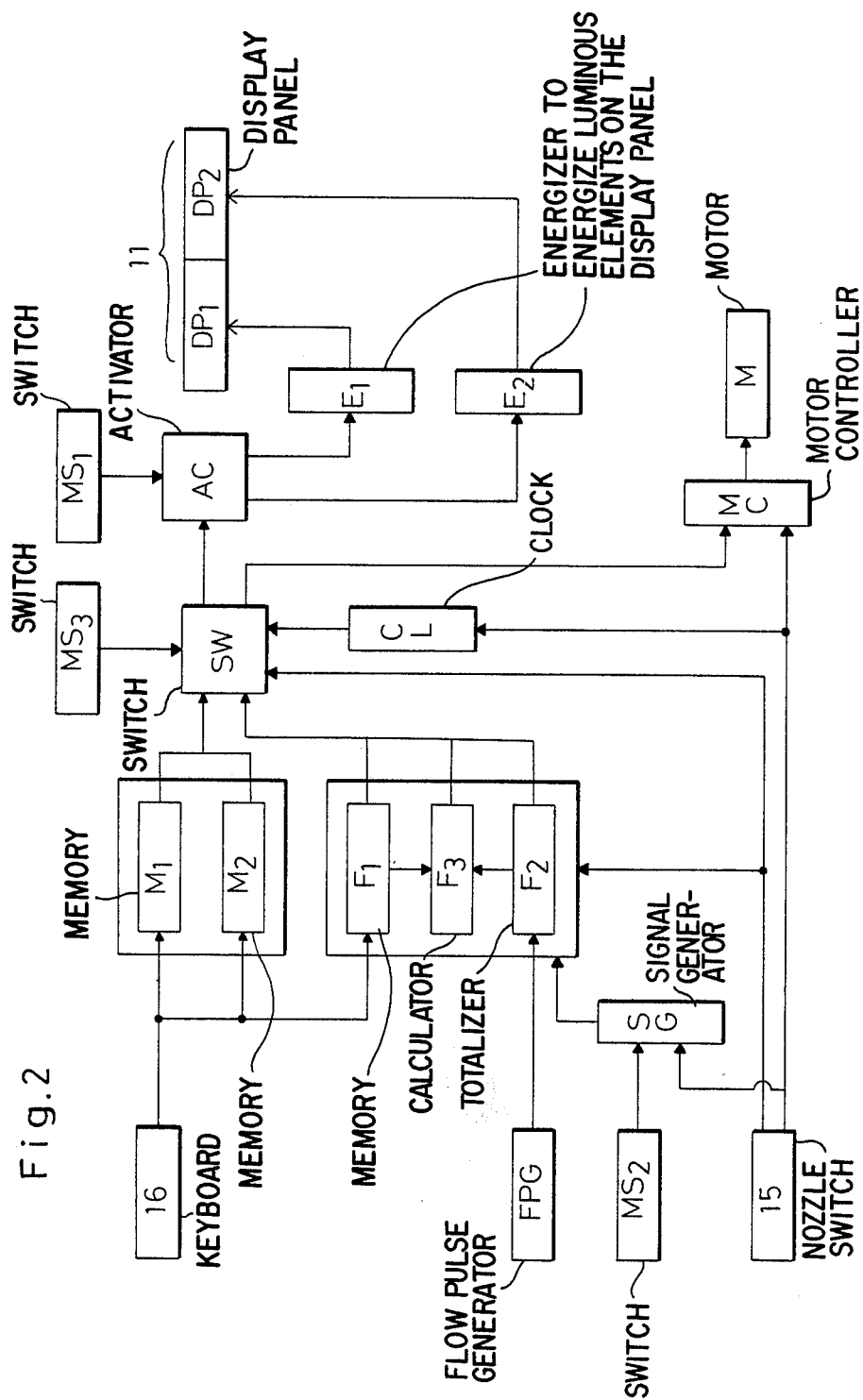
FIG. 2 is a block diagram illustrating various means inclusive of microcomputers contained in said dispenser casing and mounted on the casing wall so as to carry out said fuel delivery display and control.

In the block diagram of FIG. 2 for showing mainly divided functions of the microcomputer, any desired messages are input from the key-board 16 shown at the left-top therein into message memory means $M_1$ and $M_2$. For instance the first message, "Special Sale Of Tires" is stored in said memory $M_1$ so as to normally appear in a scrolling mode on the display panel 11 ($DP_1+DP_2$) of the dot-matrix type (FIG. 5) shown at the right-top in FIG. 2. Energizing means E ($E_1+E_2$) energizes luminous elements of the display panel corresponding to signals given from said memory means $M_1$. The second message, e.g. "Welcome" stored in the second memory means $M_2$ appears on the panel 11 ($DP_1+DP_2$) through said energizing means E ($E_1+E_2$) in a transversely or longitudinally scrolling mode (FIG. 5) when the hose nozzle 13 is taken up from the receptacle 12 in order to begin the fuel delivery, instead of said first message. Depending on the letters of this second message, it is not always possible to find out faults in the luminous elements. Thus it is preferable to energize at least one vertical row (in FIG. 5, two rows) of the elements to transversely scroll together with said letters. When the message is indicated with vertically scrolling, at least one transverse row (in FIG. 6, two rows) of the elements vertically scroll together with the message. The second message also includes at least one vertical or transverse line. This switchover of the message is made in such a way that switching means SW which is arranged between said memory means $M_1$, $M_2$ and said energizing means E is actuated by a signal given when the nozzle switch 15 is changed to the "ON" position.

When one or more luminuous elements of the dot-matrix are down, the fuel delivery information appearing on the panel can not be correctly read. It is thus preferable to confirm if all elements are energized before commencing the fuel delivery. For that purpose all elements can be energized, but this requires a high electric capacity and consequently the cost is considerably raised. According to the invention said second message is utilized therefor.

Figure 5:
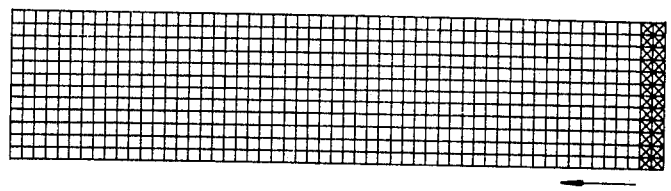
FIG. 5 shows lateral or horizontal scrolling in which the message repeatedly moves across the screen in a horizontal direction.
Figure 6:
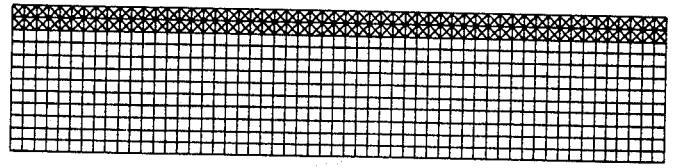
FIG. 6 is a similar view showing vertical scrolling.

In FIG. 5, for instance luminous elements of two vertical rows and letters representing said message are successively energized so as to scroll from the right to the left whereby it is possible to find if there is any trouble. FIG. 6 shows vertical scrolling. Electric capacity of the concerned means can be made low thereby, say at least about 30%.

When any trouble which may adversely affect the correct reading of the fuel delivery information is found, a switch $MS_1$ is manually actuated so that an activating means AC arranged between said switching means SW and energizing means $E_1$, $E_2$, is adapted to activate either of said means $E_1$ and $E_2$ to display the delivered fuel volume only on either of the first half $DP_1$ or the second half $DP_2$ of the dot-matrix display panel 11, as an emergency measure.

Said switching means SW is so designed as to energize a motor M for driving the fuel delivery pump and switch over the display from the second message to the fuel delivery information after the termination of the second message.

Figure 4A:
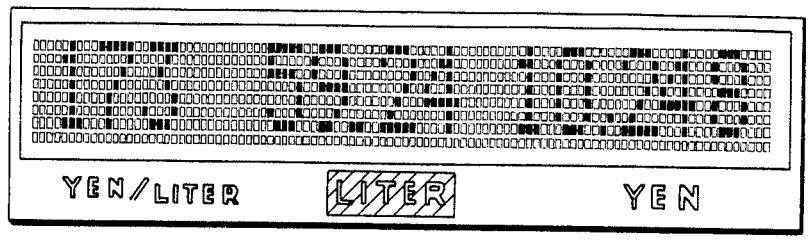
FIGS. 4A and 4B are front views of the display panel showing respectively all of the unit volume, the volume of the delivered fuel and the total price to be paid by the customer, and the delivered fuel volume only.
Figure 4B:
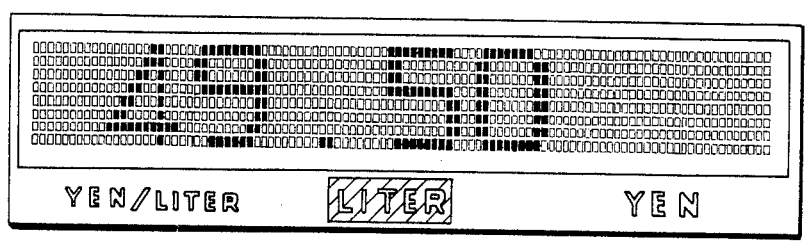

The unit volume price for the day is stored in advance in memory means $F_1$ from the key-board 16. A totalling means $F_2$ determines the total volume of the delivered fuel according to a pulse signal from a flow pulse generating means FPG. A calculating means $F_3$ calculates the total price to be paid by the customer from the numerical figures stored in memory means $F_1$ and the totalling means $F_2$. Generally all of said numerical figures stored in memory means $F_1$, totalling means $F_2$ and calculating means $F_3$ are indicated on the display panel 11 ($DP_1+DP_2$) as shown in FIG. 4A through said switching means SW, activating means AC and energizing means E ($E_1+E_2$).

When it is necessary to indicate only the numerical figures stored in said means $F_2$, a second switch $MS_2$ on said key-board 16 is manually actuated before taking up the nozzle from the receptacle and consequently while the nozzle switch 15 is in an "OFF" position, in reply to a signal generating means SG the fuel information stored in $F_1$ and $F_3$ are not displayed.

When the hose nozzle is hung in the receptacle, the nozzle switch 15 is brought again to an "OFF" position whereby a motor controlling means MC opens the circuit to stop the motor M and said switching means SW is activated so as to indicate the first message stored in the memory means $M_1$ after the lapse of a predetermined time which is set in a clocking means CL. When it is necessary to read out the fuel delivery information again on the display panel, a third switch $MS_3$ is manually actuated in reply to which the switching means SW switches over the display from the message to the desired fuel information still stored in memory means $F_1$, totalling means $F_2$ and calculating means $F_3$.

Figure 3:
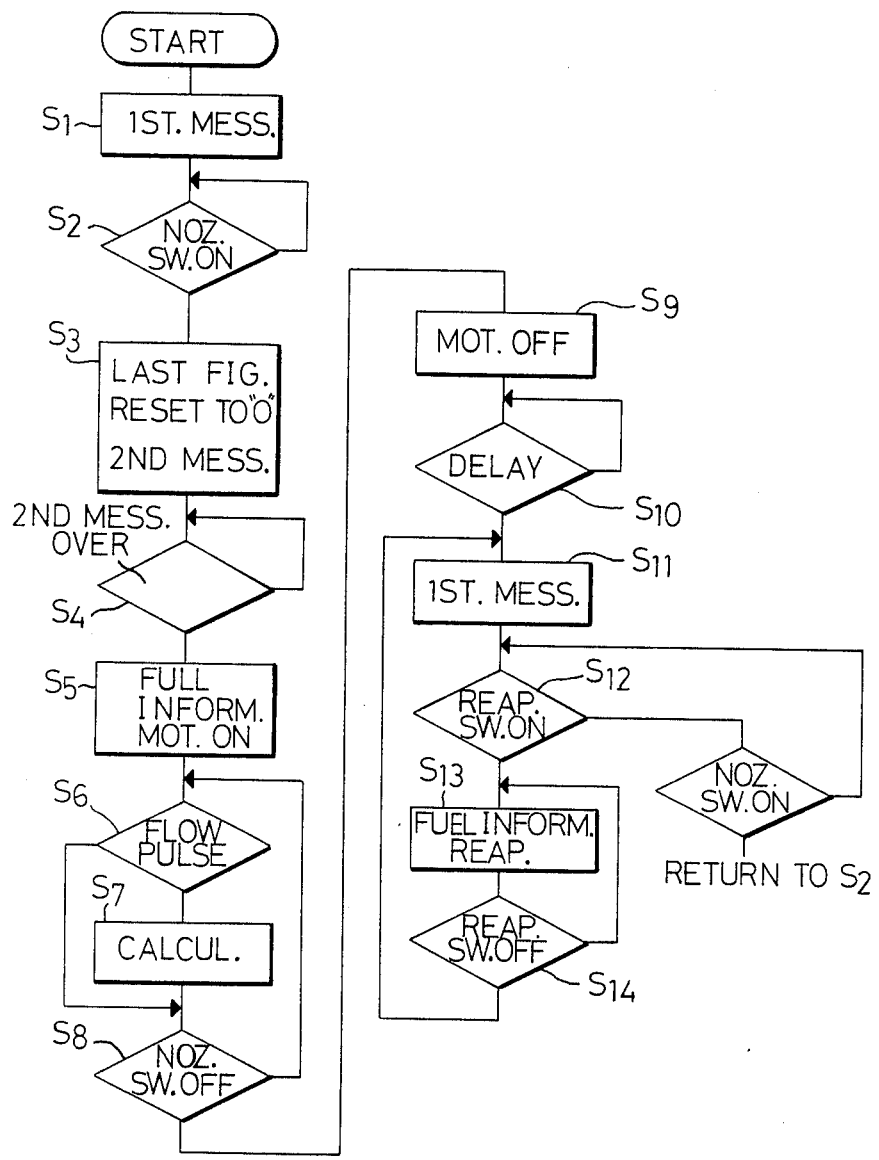
FIG. 3 is a flow chart of operation of the above.

Now in reference to the flow chart of FIG. 3, steps of the operation will be explained. When opening the gasoline station, the main switch (not shown) is closed so that the operation is started to indicate the first message, "Special Sale Of Tires" on the display panel 11 in the scrolling way (Step 1).

When the nozzle 13 is taken up in order to commence the fuel delivery, and consequently the nozzle switch 15 is changed to be in an "ON" position (Step 2), the numerical figures of the last fuel delivery stored in memory means $F_2$ and $F_3$ are respectively reset to "zero" and the second message "Welcome" appears with scrolling on the display panel 11 (Step 3). When said scrolling second message is over (Step 4), numerical figures of fuel information, e.g. 173 (Yens per liter) as the unit volume price, 0 as the volume of delivered fuel and 0 as the total price to be paid, appear on the display 11 according to the information then stored in means $F_1$, $F_2$ and $F_3$ and the motor M for driving the pump is energized (Step 5).

When the fuel delivery is commenced by actuating the trigger of the nozzle 13, the flow pulse generating means FPG supplys pulses to the totalling means $F_2$ which integrates said pulses to total the amount of the delivered fuel and the calculating means $F_3$ proceeds with multiplication of figures from means $F_1$ and $F_2$ to display the calculated figures on the display panel 11 (Step 7).

When the requested volume of fuel has been delivered, the nozzle 13 is hung on the hook again whereby the nozzle switch 15 is changed to be in an "OFF" position (Step 8). Thereby the pump motor M is deenergized (Step 9). After the lapse of a predetermined time (Step 10), the clocking means CL actuates the switching means SW to switch over from the fuel information display to the first message display (Step 11). During said delay, the fuel information can be read, but if necessary the switch $MS_3$ is manually actuated for reappearance so that the switching means SW is actuated (Step 12) to display the fuel information again (Step 13). When said switch $MS_3$ is manually actuated to be in an "OFF" position (Step 14), the processing is returned to the Step 11 where the first message is displayed.

When the nozzle 13 is taken up to deliver the fuel for a new customer, the processing is returned to Step 2 for repeating said process.

What is claimed is:

1. A fuel delivery display and control system for a fuel dispensing apparatus comprising:
   a dot matrix display panel having a plurality of elements operable to be energized to display numerals and letters of the alphabet;
   first memory means for storing a first message and for feeding signals representing said first message to said display panel;
   second memory means for storing a second message and for feeding signals representing said second message to said display panel;
   fuel delivery information means operable to provide signals representing fuel volume and price information relating to fuel dispensed by the fuel dispensing apparatus and for feeding said latter signals to said display panel;
   first switch means operable to provide a fuel take-up signal and a fuel hang-up signal;
   clock means operably connected to said first switch means for generating a signal to cause display of said fuel volume and price information on said display panel by said fuel delivery information means to be switched over to display of said first message on said display panel by said first memory means upon expiration of a predetermined period of time after said first switch means has switched to provide said hang-up signal;
   second switch means operably connected to said first and second memory means and to said first switch means and operable to switch display of said first message on said display panel by said first memory means to display of said second message on said display panel by said second memory means upon receiving a take-up signal from said first switch means, said second switching means being also connected to said fuel delivery information means and operable to subsequently switch display of said second message on said display panel by said second memory means to display of said fuel volume and price information on said display panel by said fuel delivery information means such that said fuel volume and price information is displayed on said display panel during dispensing of fuel by the fuel dispensing apparatus,
   whereby said first and second messages and said fuel volume and price information are sequentially and automatically displaced on said display panel during operation of the fuel dispensing apparatus.

2. A fuel delivery display and control system according to claim 1, wherein the fuel dispensing apparatus comprises a dispensing nozzle which is manually operable to be mounted in a mounted position on a nozzle support means and to be manually removed from said mounted position on said support means to dispense fuel, said first switch means comprising a switch part actuated by said nozzle as the latter is placed in said mounted position to provide said hang-up signal and actuated by said nozzle as the latter is removed from said mounted position to provide said take-up signal.

3. A fuel delivery display and control system according to claim 2, wherein said fuel delivery information means stores a unit volume price and is operable to calculate and deliver signals representing the total fuel volume delivered and the total calculated price for said total fuel volume delivered to said display panel, said second switching means being operable to actuate said display panel to reset said displayed total fuel volume and said displayed total calculated price to zero when said first switch means sends its take-up signal, whereby the total fuel volume delivered and the total calculated price of the prior dispensing operation is erased and reset to zero when said nozzle is taken up and removed from said mounted position on said nozzle support means.

4. A fuel delivery display and control system according to claim 1, wherein said display panel comprises a plurality of horizontal rows and a plurality of vertical columns of dot matrixes which define a display screen, said display panel being operable to display said first and second messages so that said first and second messages repeatedly move along said screen.

5. A fuel delivery display and control system according to claim 4, wherein said second message is represented by at least one column of dot matrixes such that when said column moves horizontally across said screen, defects in any of said dot matrixes will be indicated.

6. A fuel delivery display and control system according to claim 4, wherein said second message is represented by at least one row of dot matrixes such that when said row moves vertically across said screen, defects in any of said dot matrixes will be indicated.

7. A fuel delivery display and control system according to claim 1, wherein said fuel delivery information means comprises a manually operated switch to switch off delivery of signals representing said fuel volume and price information to said display panel.

8. A fuel delivery display and control system according to claim 1, wherein said display panel comprises a first portion and a second portion, said display panel having manually actuated switch means to selectively switch over to utilize either said first portion, said second portion, or both said first and second portions, whereby the entire display panel is utilized for display and when there is a defect in a dot matrix in the display panel, said manually actuated switch means switches over to effect display only in that portion which does not have said defect.

9. A fuel delivery display and control system according to claim 8, wherein said first and second portions each represent one half of the display panel.

10. A fuel delivery display and control system according to claim 1, wherein said second switching means comprises a manually actuated switch element for switching over display of said first message on said display panel to display of said fuel volume and price information on said display panel.

* * * * *